(12) United States Patent
Moon et al.

(10) Patent No.: US 9,424,631 B2
(45) Date of Patent: Aug. 23, 2016

(54) DEVICE AND METHOD FOR CALCULATING DYNAMIC VARIATION OF OBJECT

(71) Applicant: Korea University Research and Business Foundation, Seoul (KR)

(72) Inventors: Young June Moon, Seoul (KR); Yongnam Song, Seoul (KR); Seung Woo Park, Seoul (KR); Zamiri Ali, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 0 days.

(21) Appl. No.: 14/676,906

(22) Filed: Apr. 2, 2015

(65) Prior Publication Data

US 2015/0206294 A1  Jul. 23, 2015

Related U.S. Application Data

(63) Continuation of application No. PCT/KR2013/000062, filed on Jan. 4, 2013.

(30) Foreign Application Priority Data

Oct. 17, 2012 (KR) .......................... 10-2012-0115644

(51) Int. Cl.
*G06T 5/00* (2006.01)
*G06T 7/20* (2006.01)

(52) U.S. Cl.
CPC .............. *G06T 5/007* (2013.01); *G06T 7/2013* (2013.01); *G06T 2207/10004* (2013.01); *G06T 2207/10028* (2013.01); *G06T 2207/20056* (2013.01)

(58) Field of Classification Search
CPC .................... G06T 2207/20148; G06T 7/0012; G06T 7/20; G06T 2207/30004
See application file for complete search history.

(56) References Cited

U.S. PATENT DOCUMENTS 4,731,863 A * 3/1988 Sezan et al. .................. 382/172
5,034,991 A * 7/1991 Hagimae et al. ............. 382/209
(Continued)

FOREIGN PATENT DOCUMENTS

| JP | 2003-084005 A | 3/2003 |
| JP | 2004-061701 A | 2/2004 |

(Continued)

OTHER PUBLICATIONS

Kreizer et al. "Real-time image processing for particle tracking velocimetry," Experiments in Fluids, Jan. 2010, vol. 48, Issue 1, pp. 105-110.*

(Continued)

*Primary Examiner* — Vu Le
*Assistant Examiner* — Alexander J Lesnick
(74) *Attorney, Agent, or Firm* — Pearne & Gordon LLP

(57) ABSTRACT

There is provided a device for calculating dynamic variation of an object, comprising: an enhancement processing unit that adjusts brightness of a pixel determined to indicate a particle dispersed in the object in at least two (2) images generated for the object at different time points; and a calculating unit that calculates dynamic variation of the object based on correlation of the different two (2) images processed by the enhancement processing unit. Herein, the enhancement processing unit sets brightness of a pixel having brightness with a threshold value or higher for each of the images to reference brightness higher than the threshold value.

4 Claims, 9 Drawing Sheets

(56) References Cited

U.S. PATENT DOCUMENTS

| | | | | |
|---|---|---|---|---|
| 5,699,454 | A * | 12/1997 | Nakai et al. | 382/172 |
| 5,832,111 | A * | 11/1998 | Florent | 382/171 |
| 6,628,833 | B1 * | 9/2003 | Horie | 382/173 |
| 2005/0070798 | A1 * | 3/2005 | Pedrizzetti et al. | 600/442 |
| 2005/0074153 | A1 * | 4/2005 | Pedrizzetti et al. | 382/128 |
| 2007/0019861 | A1 * | 1/2007 | Zwanger | 382/171 |
| 2007/0268602 | A1 * | 11/2007 | Mori et al. | 359/871 |
| 2008/0015440 | A1 * | 1/2008 | Shandas et al. | 600/458 |
| 2008/0123898 | A1 * | 5/2008 | Zhou | 382/100 |
| 2009/0028404 | A1 * | 1/2009 | Bussadori et al. | 382/130 |
| 2012/0155725 | A1 * | 6/2012 | Bathe et al. | 382/128 |
| 2012/0237104 | A1 * | 9/2012 | Fouras et al. | 382/132 |
| 2014/0073000 | A1 * | 3/2014 | Sun et al. | 435/34 |

FOREIGN PATENT DOCUMENTS

| | | |
|---|---|---|
| JP | 2005-140528 A | 6/2005 |
| KR | 10-2001-0081161 A | 8/2001 |
| KR | 10-1136814 B1 | 4/2012 |

OTHER PUBLICATIONS

Chan et al. "Real-time image compression for high-speed particle tracking," Review of Scientific Instruments 78, 023704 (2007).*
International Search Report for PCT/KR2013/000062 dated Jun. 21, 2013.
European Search Report for 13 846 403.7 dated Apr. 7, 2016.
Kreizer, et al., "Real-Time Image Processing for Particle Tracking Velocimetry", vol. 48, No. 1, Jul. 23, 2009, pp. 105-110.

* cited by examiner

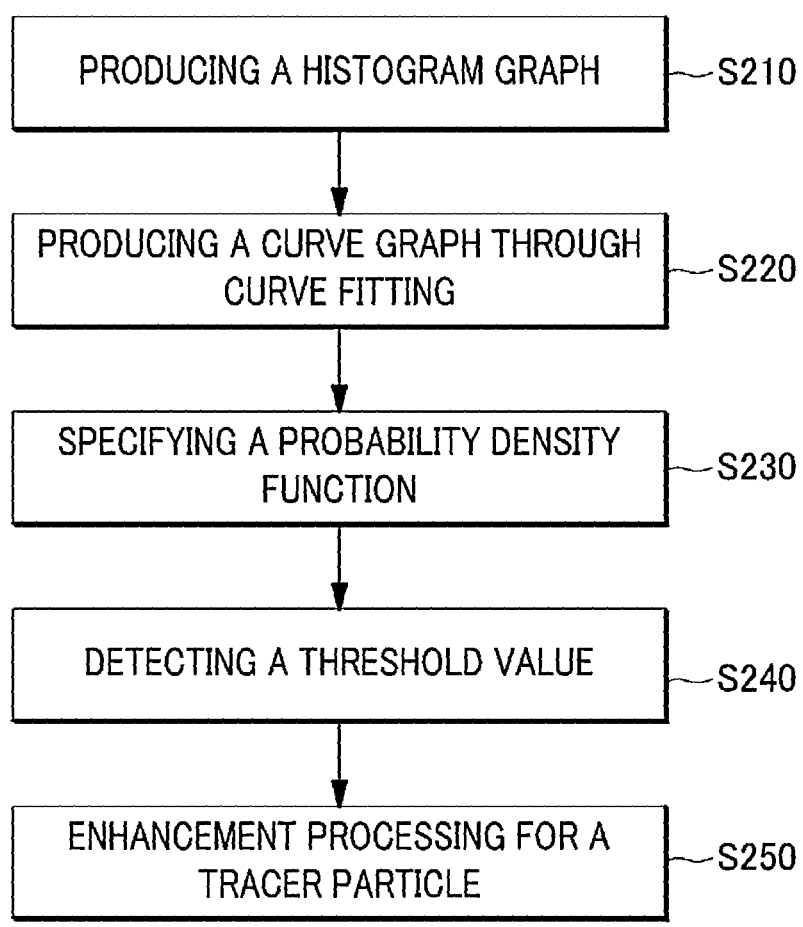

DEVICE AND METHOD FOR CALCULATING DYNAMIC VARIATION OF OBJECT

CROSS-REFERENCE TO RELATED APPLICATION

This application claims the benefit of Korean Patent Application No. 10-2012-0115644 filed on Oct. 17, 2012 and PCT Application No. PCT/KR2013/000062 filed on Jan. 4, 2013, the entire disclosures of which are incorporated herein by reference.

TECHNICAL FIELD

The embodiments described herein pertain generally to a device and a method for calculating dynamic variation of an object.

BACKGROUND ART

In recent, there has been known a technology that measures and visualizes velocity of fluid by using a particle image velocimetry (PIV) method. A PIV device visually represents flow of fluid, and is a technology that can measure, for example, instantaneous velocity of a tracer particle in a cross section of fluid. In this case, a tracer particle is dispersed in fluid, which is an object for velocity measurement, and a size of the tracer particle is small enough to sufficiently follow flow of the fluid. Meanwhile, the technology applied to the PIV device may be divided into a method that measures velocity based on an image photographed through a CCD camera and an echo PIV method that uses ultrasonic waves, according to an optical method.

For example, the echo PIV device radiates an ultrasonic beam to target fluid, and determines gradation of an ultrasonic image based on intensity of an echo signal radiated by an ultrasonic contrast agent dispersed in the target fluid. In addition, a position of a scatterer in the traveling direction of the ultrasonic beam can be identified from a period of time from radiation of an ultrasonic signal to reception of an echo signal.

However, there may be the case where it is difficult to exactly measure velocity of fluid depending on an environment where the PIV method is used, e.g., characteristics of the fluid.

For example, there may be difficulty in measuring blood flow velocity within the left ventricle by using the echo PIV device. That is, if any tissue of the left ventricle radiates an echo signal having similar intensity to that of the tracer particle, it is difficult to clearly discriminate an acquired ultrasonic image, and there may be the possibility that an error will occur in measuring the velocity.

In this regard, Korean Patent No. 1136814 (Title of Invention: A Method for Estimating a Hemorheological Factor of Blood Flow by Using a Red Blood Cell as a Tracer Particle) describes: a first stage of photographing and storing two (2) blood flow images for a red blood cell flowing within a blood vessel at a certain time interval by using particle image velocimetry (PIV); a second stage of calculating an instantaneous velocity field from displacement of the position of the red blood cell observed in each of the images photographed in the first stage and the time interval for photographing the two (2) images; a third stage of determining a velocity field distribution function, which is a radial coordinate function of the blood vessel, after curve fitting from an average velocity field, which is an average of a multiple number of the instantaneous velocity fields calculated in the second stage; a fourth stage of determining a shear rate from the velocity field distribution function; and a stage of determining a hemorheological characteristic from the shear rate determined in the fourth stage so as to predict a disease.

SUMMARY

In view of the foregoing problems, example embodiments provide a device and a method for calculating dynamic variation of an object, which are capable of clearly discriminating a tracer particle and a peripheral image so as to minimize an error in velocity measurement.

In accordance with a first aspect of example embodiments, there is provided a device for calculating dynamic variation of an object, comprising: an enhancement processing unit that adjusts brightness of a pixel determined to indicate a particle dispersed in the object in at least two (2) images generated for the object at different time points; and a calculating unit that calculates dynamic variation of the object based on correlation of the different two (2) images processed by the enhancement processing unit. Herein, the enhancement processing unit sets brightness of a pixel having brightness with a threshold value or higher for each of the images to reference brightness higher than the threshold value.

Further, the device for calculating dynamic variation of an object may comprise a pre-processing unit that implements pre-processing for the at least two (2) images generated at the different time points. Herein, the enhancement processing unit adjusts brightness of a pixel for the images that have been subject to the pre-processing.

Further, the device for calculating dynamic variation of an object may comprise an information providing unit that visually represents and provides the calculated dynamic variation in the images.

Especially, the enhancement processing unit may produce a curve graph through curve fitting for a histogram graph obtained by accumulating the number of pixels according to brightness intensity of the pixels included in the images, and set the threshold value based on the curve graph.

Especially, the enhancement processing unit may set the threshold value to an intensity value corresponding to a cross point between a straight line contacting with a starting point of the curve graph and an X axis.

Especially, the enhancement processing unit may set the threshold value to a value of an X axis of a quadrangle having a Y axis value of the starting point of the curve graph as height, and the threshold value may be set to a value of the X axis when a first part surrounded by an upper portion of the curve graph and the quadrangle and a second part positioned in a lower portion of the curve graph in an outside area of the quadrangle have the same area.

Herein, the reference brightness may be maximum brightness.

In accordance with second first aspect of example embodiments, there is provided a method for calculating dynamic variation of an object by using the device for calculating dynamic variation of an object, the method comprising: adjusting brightness of a pixel determined to indicate a particle dispersed in an object in at least two (2) images generated for the object at different time points; and calculating dynamic variation of the object based on correlation of the different two (2) images that have been subject to the adjustment of the brightness. Herein, the adjustment of the brightness sets brightness of a pixel having brightness with a threshold value or higher for each of the images to reference brightness with the threshold value or higher.

Especially, the adjustment of the brightness may comprise: producing a curve graph through curve fitting for a histogram graph obtained by accumulating the number of pixels according to brightness intensity of the pixels included in the images; and setting the threshold value based on the curve graph.

Especially, the setting of the threshold value based on the curve graph may set the threshold value to an intensity value corresponding to a cross point between a straight line contacting with a starting point of the curve graph and an X axis.

Especially, the setting of the threshold value based on the curve graph may set the threshold value to a value of an X axis of a quadrangle having a Y axis value of the starting point of the curve graph as height, and the threshold value may be set to a value of the X axis when a first part surrounded by an upper portion of the curve graph and the quadrangle and a second part positioned in a lower portion of the curve graph in an outside area of the quadrangle have the same area.

Herein, the reference brightness may be maximum brightness.

In accordance with the example embodiments, the dynamic variation calculating device can more exactly calculate dynamic variation of an object, by using displacement of a tracer particle between different two (2) images. That is, in a relation between a tracer particle included in an image, which is a reference for velocity calculation, and a peripheral image, the dynamic variation calculating device can clearly calculate displacement of a tracer particle in different two (2) images, through enhancement processing that sets brightness of the tracer particle to reference brightness or higher.

BRIEF DESCRIPTION OF THE DRAWINGS

FIG. 2 is a flow chart showing a particle enhancement processing method in accordance with an example embodiment.

DETAILED DESCRIPTION

Figure 1:
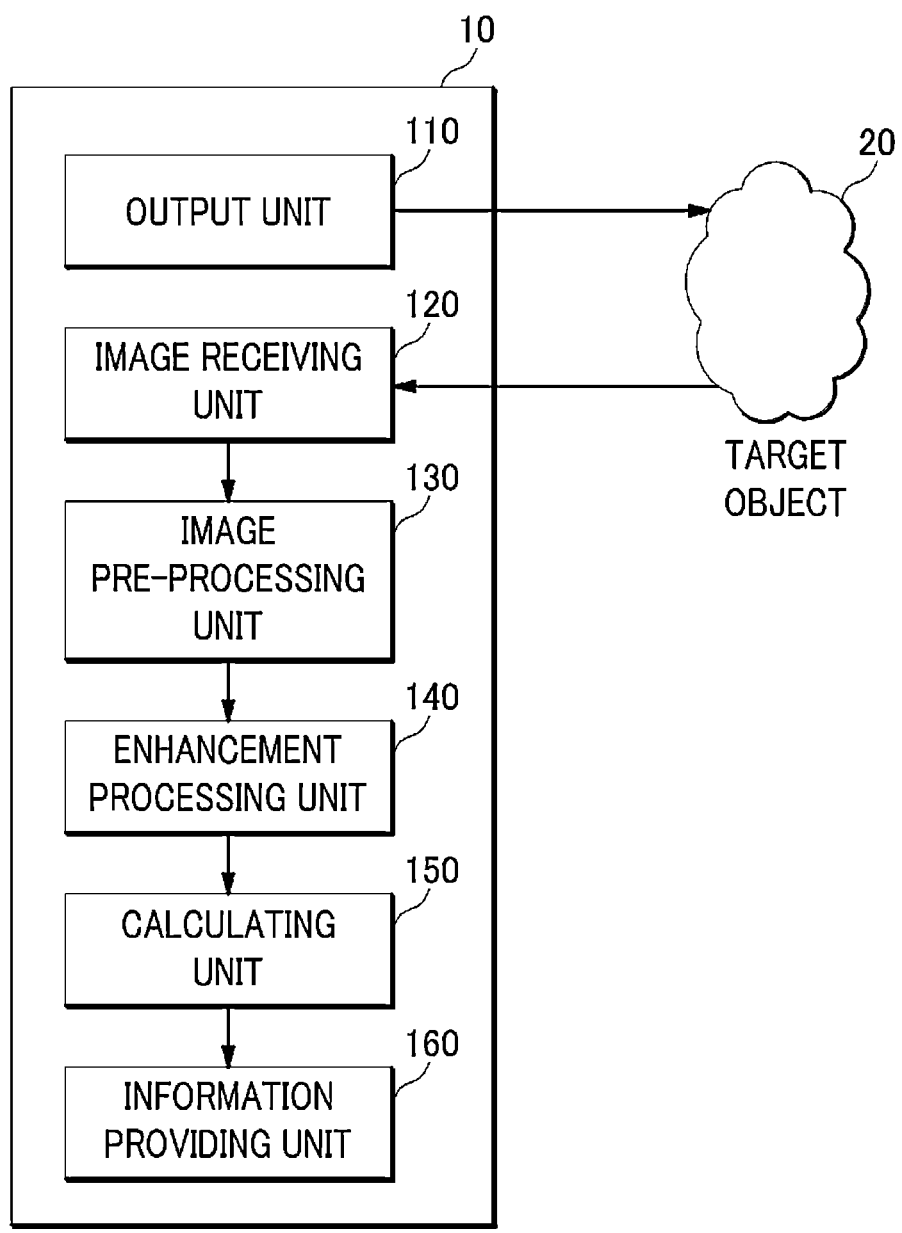
FIG. 1 shows a dynamic variation calculating device in accordance with an example embodiment.

Hereinafter, example embodiments will be described in detail with reference to the accompanying drawings so that inventive concept may be readily implemented by those skilled in the art. However, it is to be noted that the present disclosure is not limited to the example embodiments, but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element and include both a case where an element is "directly connected or coupled to" another element and a case where an element is "electronically connected or coupled to" another element via still another element. Further, the term "comprises or includes" and/or "comprising or including" means that one or more other components, steps, operations, and/or the existence or addition of elements are not excluded in addition to the described components, steps, operations and/or elements.

FIG. 1 shows a dynamic variation calculating device in accordance with an example embodiment.

The dynamic variation calculating device 10 includes an output unit 110, an image receiving unit 120, an image pre-processing unit 130, an enhancement processing unit 140, a calculating unit 150 and an information providing unit 160.

The output unit 110 outputs a laser or ultrasonic signal to an object to be photographed 20. For example, the output unit 110 may emit laser beam sheet at each of different first and second time points like an optical PIV device, or output an ultrasonic signal at each of first and second time points like an echo PIV device. In addition, the output unit 110 may output an X ray used in a computed tomography (CT) device or a certain range of a high frequency signal used in a magnetic resonance imaging (MRI) device.

The image receiving unit 120 receives images generated at different time points for the object to be photographed 20. For example, the image receiving unit 120 receives images generated at different time points, like a first image generated at a first time point and a second image generated at a second time point. In this case, the first and second time points may be continuous or discrete with a certain time interval.

For example, the image receiving unit 120 provides a CCD camera in a direction perpendicular to the laser beam sheet like the optical PIV device, and receives an image acquired through the CCD camera. Also, the image receiving unit 120 receives an ultrasonic image generated based on an ultrasonic signal like the echo PIV device. In addition, the image receiving unit 120 may receive an image generated based on an X ray like a CT device, or an image generated based on a high frequency signal like an MRI device.

The image pre-processing unit 130 implements pre-processing for the received images.

For example, the image pre-processing unit 130 may eliminate noise through a Gaussian smoothing filter or a median filter, or implement bilinear interpolation.

The Gaussian smoothing filter is used for processing of noise included in the received images, and convolutes each pixel of the input images and a Gaussian kernel with each other to generate a resulting image. Especially, it is possible to change a degree of smoothing through setting of standard deviation of a Gaussian distribution function.

Math Formula 1 below presents the Gaussian distribution function, and Math Formula 2 below presents an example for a two-dimensional Gaussian smoothing filter.

$$h_g(n_1, n_2) = e^{\frac{-(n_1^2+n_2^2)}{2\sigma^2}} \quad \text{[Math Formula 1]}$$

$$h(n_1, n_2) = \frac{h_g(n_1, n_2)}{\sum_{n_1}\sum_{n_2} hg} \quad \text{[Math Formula 2]}$$

Next, the median filter is used to eliminate impulse noise included in the received images, and replaces a value for a certain point with a median value within a window based on the point. The median filter is known to have high efficiency in eliminating impulse noise, and preserving a boundary, compared to a mean filter.

Next, the bilinear interpolation is a calculation method used to obtain a value of a random position within a quadrangle, when only four (4) end points of the quadrangle are given, and uses linear interpolation over again.

Math Formula 3 below is a math formula to apply the bilinear interpolation, the symbol $\lfloor \ \rfloor$ refers to a floor function, and $\langle x \rangle := x - \lfloor x \rfloor$ refers to a fractional part.

$$u(x, y) = \qquad \text{[Math Formula 3]}$$
$$(1-\langle x \rangle)(1-\langle y \rangle)v_{\lfloor x \rfloor, \lfloor y \rfloor} + \langle x \rangle(1-\langle y \rangle)v_{\lfloor x \rfloor+1, \lfloor y \rfloor} +$$
$$(1-\langle x \rangle)\langle y \rangle v_{\lfloor x \rfloor, \lfloor y \rfloor+1} + \langle x \rangle\langle y \rangle v_{\lfloor x \rfloor+1, \lfloor y \rfloor+1}$$

This pre-processing process can decrease a noise signal, and is effective in enhancing only a pixel indicating a tracer particle in a process for implementing enhancement processing later. Meanwhile, the pre-processing process may be omitted or modified according to selection of a performer.

The enhancement processing unit 140 enhances signal intensity of the tracer particle included in the received images, to increase a difference in signal intensity between the tracer particle and a part other than the tracer particle. Especially, the enhancement processing unit 140 implements enhancement processing to brighten a pixel determined to indicate a particle dispersed in an object in at least two (2) images generated at different time points.

When the received images are ultrasonic images, or the Gaussian smoothing filter is applied through the image pre-processing unit 130, if discrimination between the tracer particle and the part other than the tracer particle is unclear due to noise signals included in other received images or others, calculating dynamic variation of the tracer particle through the calculating unit 150 may be difficult. More specifically, the calculating unit 150 regards points having the highest brightness intensity as tracer particles, and calculates dynamic variation by using displacement of the tracer particles; however, in the case where there is a point that is not an actual tracer particle but is similar to a tracer particle in terms of intensity of brightness, there is a possibility that an error will occur in calculating the dynamic variation. To solve this problem, the example embodiments regard image data meeting certain requirements as tracer particles, and implement enhancement processing to set brightness of the tracer particles to the maximum.

Meanwhile, the tracer particle defined in the example embodiments is dispersed in an object to be traced in order to identify fluid flow or dynamic variation of the object to be traced, and for example, substance like a contrast agent may function as a tracer particle. For example, a bubble shape may appear in the received images, by the tracer particle forming the contrast agent dispersed in the object to be traced, and a pixel forming the bubble shape may be a pixel indicating each tracer particle.

Figure 3A:
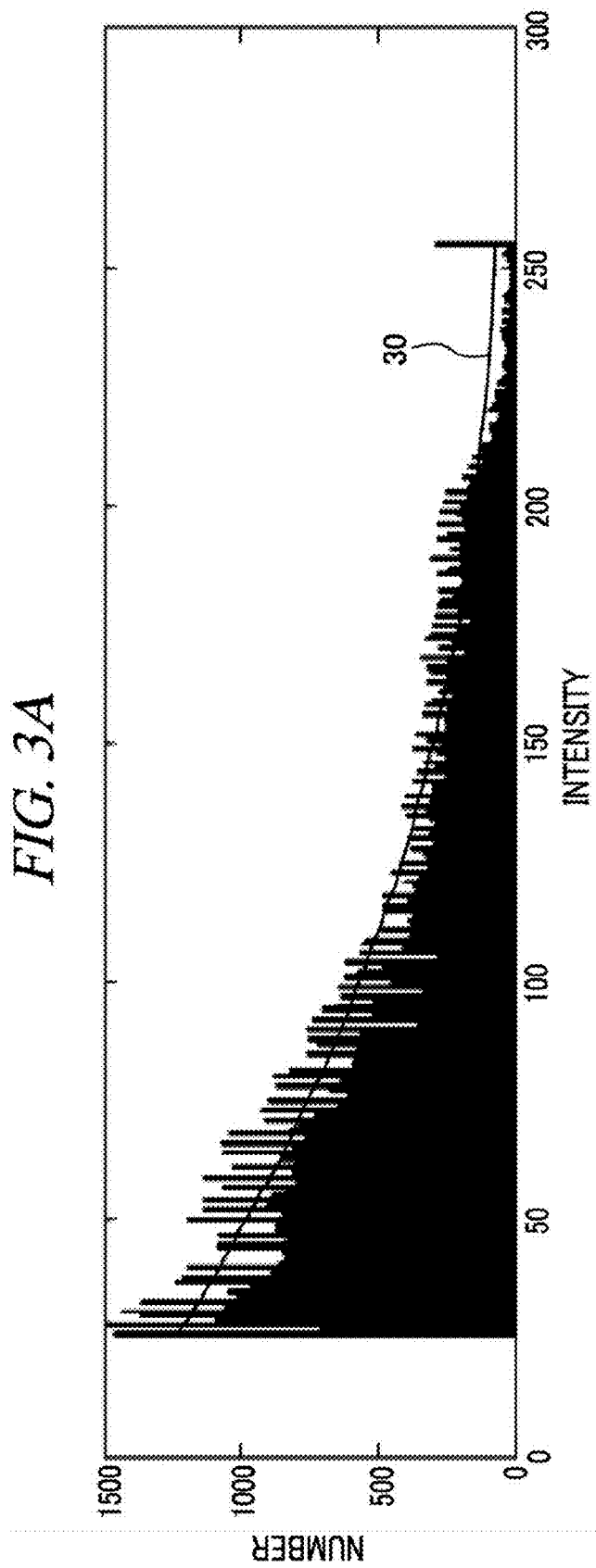
FIGS. 3A-3C show a particle enhancement processing algorithm.
Figure 3B:
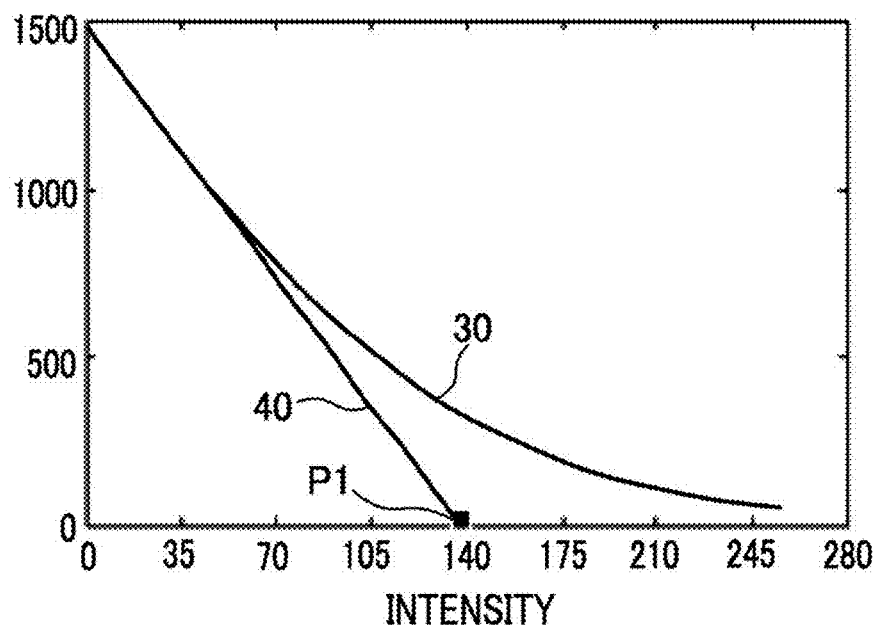
Figure 3C:
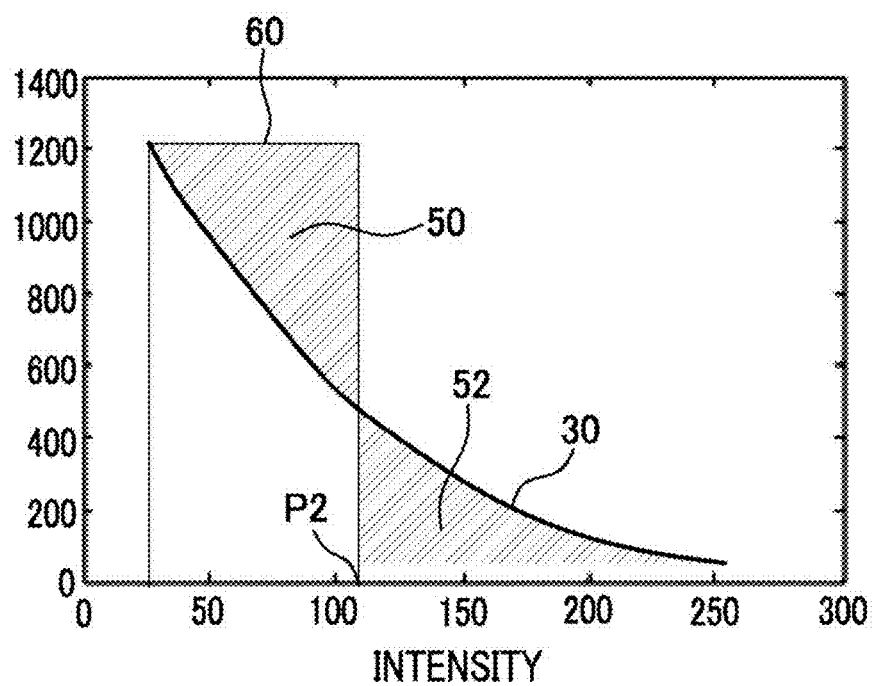

FIG. 2 is a flow chart showing a particle enhancement processing method in accordance with an example embodiment, and FIGS. 3A-3C show a particle enhancement processing algorithm.

First, a histogram graph is produced based on brightness intensity of pixels included in the received images (S120). As illustrated in FIG. 3A, the histogram graph may be produced by a method that accumulates the number of pixels according to brightness intensity of each of the pixels. From the illustrated graph, it can be identified that as brightness intensity of the pixels increases, the number of the pixels having the corresponding brightness intensity decreases.

Next, a curve graph 30 is produced through curve fitting, based on the histogram graph (S220). Through the curve fitting, the curved graph 30 in the form illustrated in FIG. 3A may be produced.

The curve fitting work for the histogram graph produced in S210 is implemented, and an interpolation or smoothing process may be additionally implemented. In addition, for example, the curve fitting may be implemented by using a least square exponential function.

For example, it is assumed that a curve graph represented by an exponential function like $y=ae^{bx}$ is produced. By taking a log on both sides of the exponential function, math formulas like Math Formula 4 below may be obtained. A function of the curve graph may be calculated in the manner that a and b are calculated, by using Math Formula 5 for each of the math formulas.

$$a\sum_{i=1}^{n} y_i + b\sum_{i=1}^{n} x_i y_i = \sum_{i=1}^{n} y_i ln y_i \qquad \text{[Math Formula 4]}$$

$$a\sum_{i=1}^{n} x_i y_i + b\sum_{i=1}^{n} x_i^2 y_i = \sum_{i=1}^{n} x_i y_i ln y_i$$

$$a = \frac{\sum_{i=1}^{n}(x_i^2 y_i)\sum_{i=1}^{n}(y_i ln y_i) - \sum_{i=1}^{n}(x_i y_i)\sum_{i=1}^{n}(x_i y_i ln y_i)}{\sum_{i=1}^{n} y_i \sum_{i=1}^{n}(x_i^2 y_i) - \left(\sum_{i=1}^{n} x_i y_i\right)^2} \qquad \text{[Math Formula 5]}$$

$$b = \frac{\sum_{i=1}^{n} y_i \sum_{i=1}^{n}(x_i y_i ln y_i) - \sum_{i=1}^{n}(x_i y_i)\sum_{i=1}^{n}(y_i ln y_i)}{\sum_{i=1}^{n} y_i \sum_{i=1}^{n}(x_i^2 y_i) - \left(\sum_{i=1}^{n} x_i y_i\right)^2}$$

Next, a probability density function corresponding to the curve graph produced through S220 is specified (S230).

That is, a normal distribution function like Math Formula 6 is specified, by specifying an average ($\mu$) and a standard deviation ($\sigma$).

$$Z(x) = \frac{1}{\sigma\sqrt{2\pi}} e^{-(x-\mu)^2/(2\sigma^2)} \qquad \text{[Math Formula 6]}$$

Next, an intensity scale, which is a reference that can determine luminescence intensity of a pixel corresponding to a tracer particle, is detected (S240). That is, a pixel having luminescence intensity in an intensity scale corresponding to a threshold value or higher is determined as a tracer particle.

In the example embodiments, the intensity scale corresponding to the threshold value is detected largely by two (2) methods.

As to the first method, as illustrated in FIG. 3B, the threshold value is set to an intensity value corresponding to a cross point P1 between a straight line 40 contacting with a starting point of the curve graph 30 and a Y axis.

As to the second method, as illustrated in FIG. 3C, an X axis of a quadrangle 60, which has a Y axis value of the starting point of the curve graph 30 as height, is set as a cross point P2. In this case, the quadrangle 60 contacts with the Y or X axis of the curve graph. The threshold value is set to an intensity value corresponding to the cross point P2 when a first part 50 surrounded by the quadrangle 60 and the cure graph 30 and a second part 52 have the same area. That is, as illustrated, the threshold value is set to an value of an X axis when a value obtained from integrating the area of the first part 50 surrounded by an upper portion of the curve graph 30 and the quadrangle 60 while changing the value of the X axis of the quadrangle, and a value obtained from integrating the area of the second part 52 positioned in a lower portion of the curve graph 30 in the outside area of the quadrangle 60 while changing the value of the X axis of the quadrangle are the same.

Next, enhancement processing is implemented to enable the pixel having the intensity with the threshold value or higher as detected in S240 to have the intensity of the reference brightness higher than the threshold value (S250).

For example, the reference brightness may be set as maximum brightness. Assuming that a bit value of a pixel having intensity of the maximum brightness is 255, a bit value of the pixel having the intensity with the threshold value or higher as detected in S240 may be set to 255.

In this way, it is possible to more clearly enhance the tracer particle prior to implementing a velocity calculating process so as to exactly calculate velocity.

Returning to FIG. 1, the calculating unit 150 calculates displacement of the tracer particle through a cross-correlation function based on the image photographed at the first time point and the image photographed at the second time point.

Figure 4:
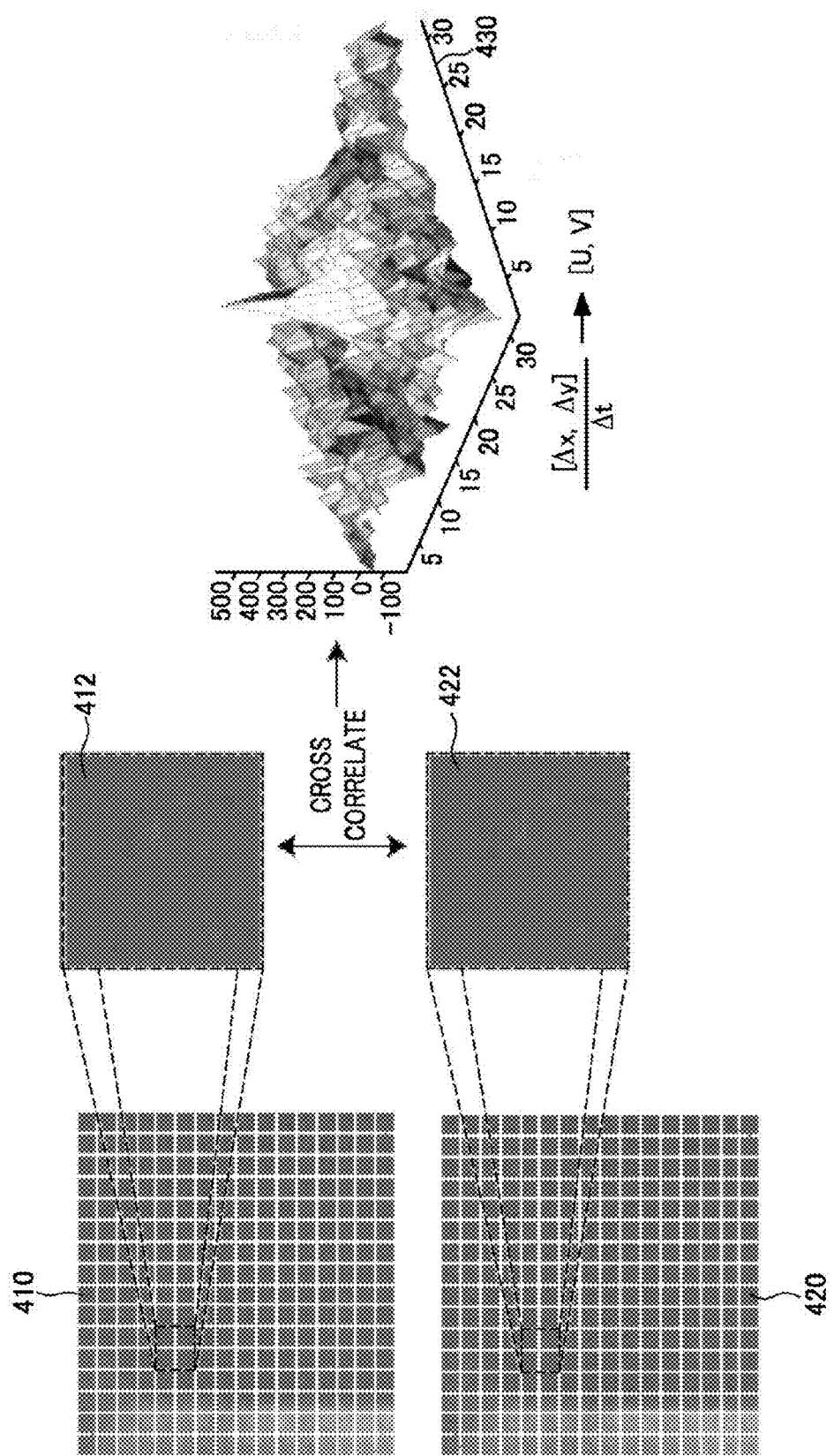
FIG. 4 shows a velocity calculating process in accordance with an example embodiment.

FIG. 4 shows a fluid flow calculating process in accordance with an example embodiment.

As illustrated, interrogation areas 412 and 422 are set for an image 410 photographed at the first time point and an image 420 photographed at the second time point, respectively, among the images received through the image receiving unit 120, and displacement is calculated for a tracer particle included in each of the interrogation areas. This velocity calculation is implemented in the unit of each of the interrogation areas, and repeated until all two-dimensional vector fields are produced. For example, the interrogation areas may have a square shape, and a size ranging from 16*16 pixels to 128*128 pixels.

The cross-correlation function may be calculated through fast Fourier transform (FFT). The fast Fourier transform represents components of an image in a frequency domain. First, FFT for the first interrogation area and FFT for the second interrogation area are obtained, and the FFTs are multiplied by each other to evaluate the cross-correlation. In addition, a value where the cross-correlation is largest is found, and inverse transform for the value is implemented. The FFT is implemented through Math Formula 7 below, and f(m,n) refers to a pixel value, and F(x,y) refers to a value in a frequency domain, and M and N refer to a size of an image.

$$F(x, y) = \sum_{m=0}^{M-1}\sum_{n=0}^{N-1} f(m, n)e^{-j2\pi(x\frac{m}{M}+y\frac{n}{N})}$$ [Math Formula 7]

$$f(m, n) = \frac{1}{MN}\sum_{m=0}^{M-1}\sum_{n=0}^{N-1} F(x, y)e^{j2\pi(x\frac{m}{M}+y\frac{n}{N})}$$

After implementing the cross-correlation processing, the point where the cross-correlation is largest indicates the displacement of the tracer particle. That is, as illustrated in FIG. 4, a position of a peak based on an original point is the displacement of the tracer particle. In order to estimate the position where the cross-correlation is largest, interpolation may be used.

As a method for sub-pixel analysis, a Gaussian peak fitting method may be used. Displacement of a sub-pixel for the peak point (x0) may be obtained as in Math Formula 8.

$$\delta x = \frac{\sum_{i,j \in P}(x_{i,j} - x_0)C_{i,j}}{\sum_{i,j \in P} C_{i,j}}$$ [Math Formula 8]

In addition, for the sub-pixel interpolation, three (3)-point estimation may be used, and applies Math Formulas 9 and 10. In this case, Zx refers to a maximum point, and Zx−1 and Zx+1 refer to values for neighboring points.

$$\Delta x = \frac{Z_{x+1} - Z_{x-1}}{Z_{x-1} + Z_x + Z_{x+1}}$$ [Math Formula 9]

$$z(x; y) = a\exp\{b_{20}(x - \Delta x)^2 + b_{11}(x - \Delta x)(y - \Delta y) + b_{02}(y - \Delta y)^2\}$$ [Math Formula 10]

$$\Delta x = \frac{\ln(Z_{x-1}) - \ln(Z_{x+1})}{2[\ln(Z_{x+1}) - 2\ln(Z_x) + \ln(Z_{x-1})]}$$

Next, after the maximum point is found, smoothing processing may be implemented.

In this way, the calculating unit 150 may implement velocity calculation by setting the interrogation areas for the images generated at different time points, and calculating the displacement of the tracer particles within the interrogation areas.

Meanwhile, FIG. 4 shows a process of calculating velocity among physical quantity showing fluid flow. Based on the calculated velocity, various types of physical quantity that can show flow of fluid like vortex or turbulence can be calculated.

Returning to FIG. 1, the information providing unit 160 may visually represent the velocity information calculated through the calculating unit 150 to provide the information to a user.

Figure 5A:
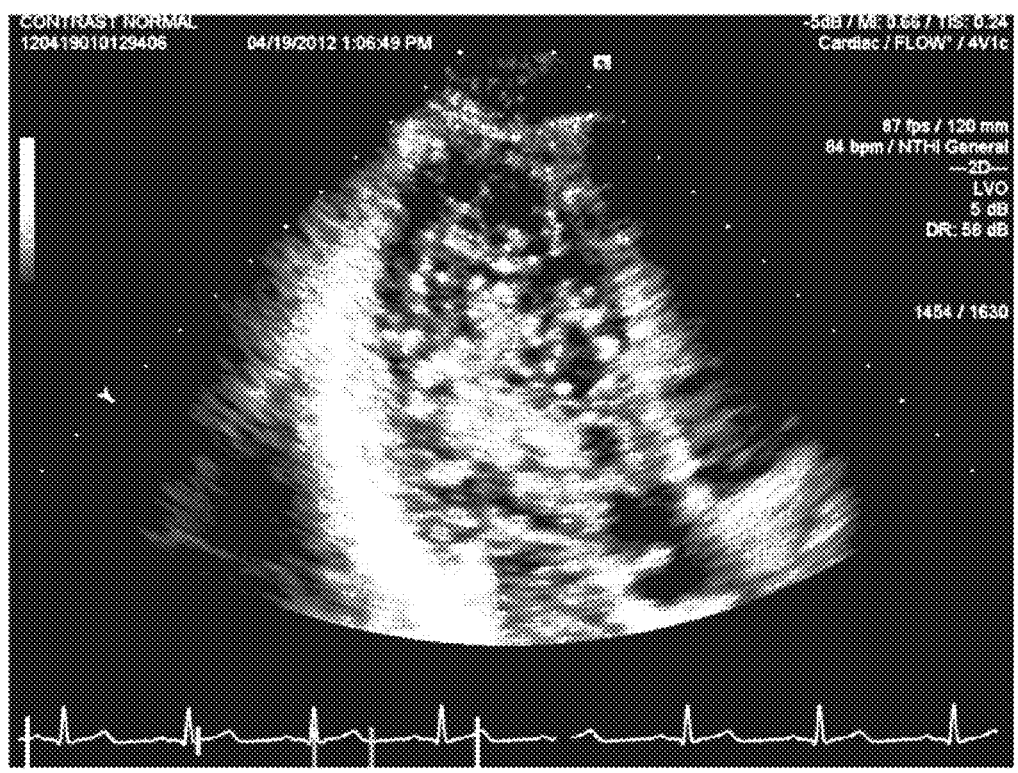
FIGS. 5A-5C show a velocity information providing screen in accordance with an example embodiment.
Figure 5B:
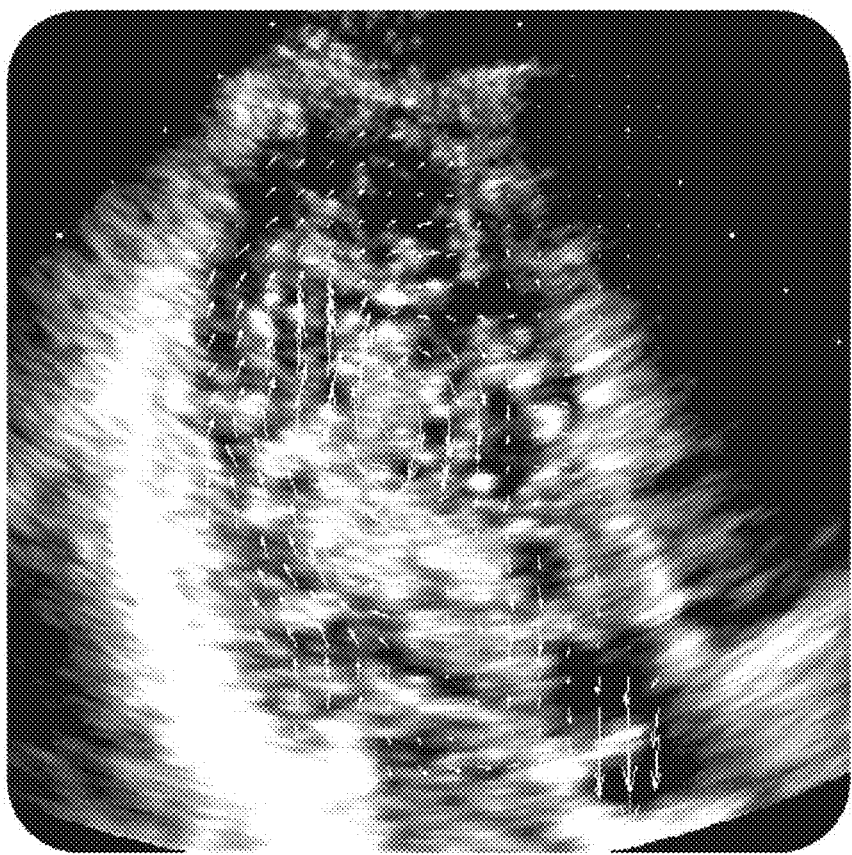
Figure 5C:
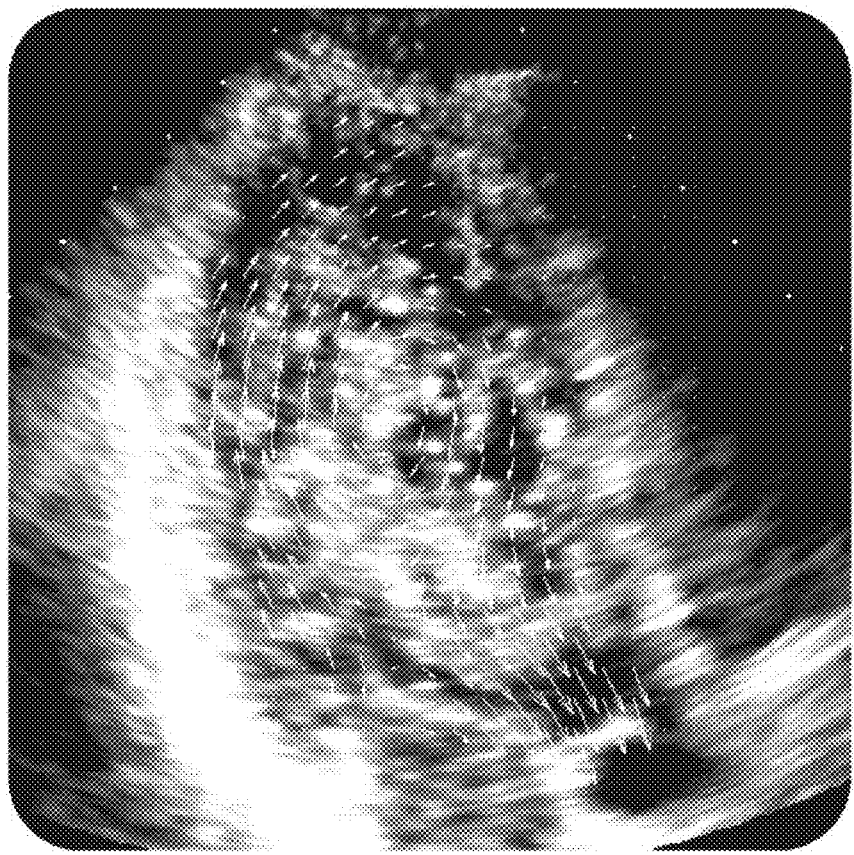

FIGS. 5A-5C show a velocity information providing screen in accordance with an example embodiment.

First, the drawing illustrated in FIG. 5A relates to implementing particle enhancement processing for a conventional ultrasonic screen, and may set intensity of a pixel determined as a tracer particle to the maximum to represent the pixel to a user.

Meanwhile, the information providing unit 160 may represent a velocity component of a tracer particle generated by an arrow, as shown in FIG. 5B or FIG. 5C. In this case, a size component of velocity may be represented by length of the arrow, and a direction component of velocity may be represented in the direction of the arrow. Meanwhile, FIG. 5B represents a velocity component calculated based on a conventional technology, i.e., an image, which has not been subject to particle enhancement processing, and FIG. 5C represents a velocity component calculated based on an image, which has been subject to particle enhancement processing in accordance with an example embodiment.

The corresponding images have been obtained from photographing blood flow in the left ventricle, and it can be identified that the velocity component represented in the image of FIG. 5C, compared to the image of FIG. 5B, is more consistent with actual blood flow in terms of the size or direction of the velocity.

Figure 6A:
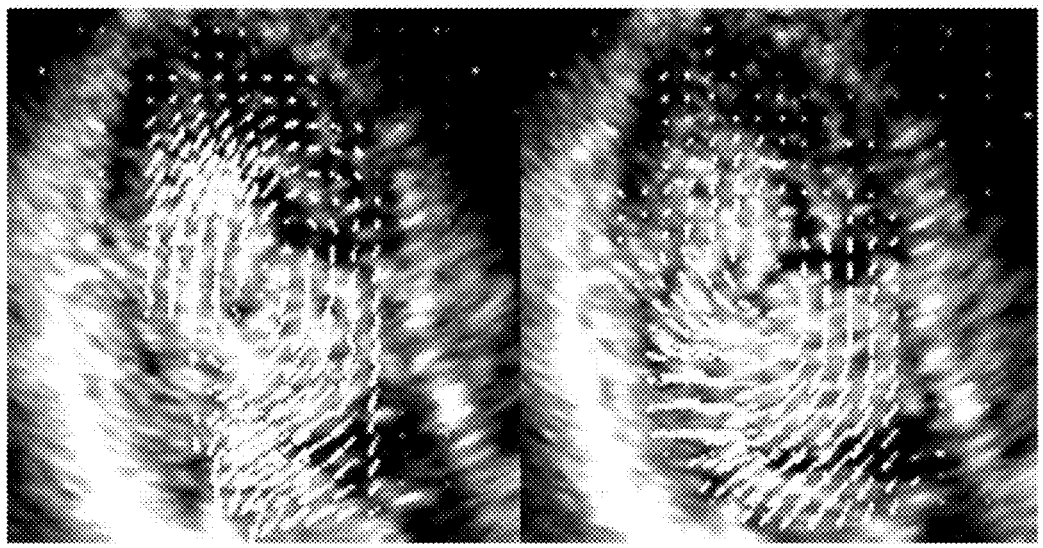
FIGS. 6A and 6B show a velocity information providing screen in accordance with an example embodiment.
Figure 6B:
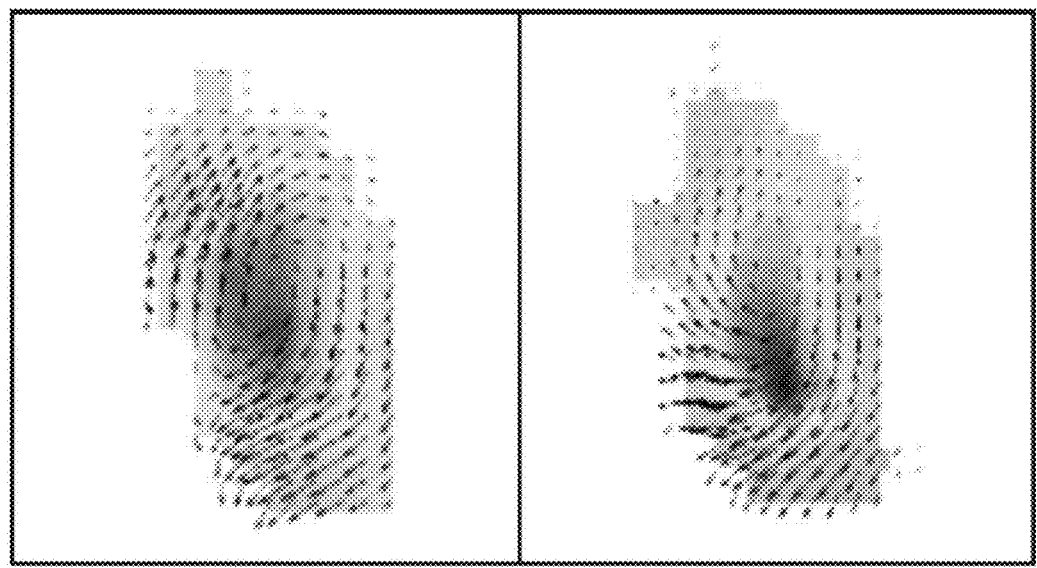

FIGS. 6A and 6B show a velocity information providing screen in accordance with an example embodiment.

Based on the velocity component calculated in accordance with an example embodiment, vorticity of fluid may be visually represented. That is, as illustrated in FIG. 6B, color of an area where spinning arrows are concentrated is represented in a different color from that of other areas. For example, by representing an area where the arrows are maintained in a straight line direction and an area where the arrows spin in different colors, it is possible to enable a user to more easily identify the point where a vortex phenomenon of fluid occurs.

As described, since the particle image velocity device or the particle image velocity method in accordance with an example embodiment is included in an ultrasonic image analyzer, an optical particle image velocity device or others, it is possible to provide convenience in enabling a user to identify movement of fluid or liquid.

For reference, the components illustrated in FIG. 1 in accordance with an example embodiment may imply software or hardware such as a field programmable gate array (FPGA) or an application specific integrated circuit (ASIC), and carry out predetermined functions.

However, the "components" are not limited to the software or the hardware, and each of the components may be stored in an addressable storage medium or may be configured to implement one or more processors.

Accordingly, the components may include, for example, software, object-oriented software, classes, tasks, processes, functions, attributes, procedures, sub-routines, segments of program codes, drivers, firmware, micro codes, circuits, data, database, data structures, tables, arrays, variables and the like.

The components and functions thereof can be combined with each other or can be divided.

Example embodiments can be embodied in a storage medium including instruction codes executable by a computer or processor such as a program module executed by the computer or processor. A computer readable medium can be any usable medium which can be accessed by the computer and includes all volatile/nonvolatile and removable/non-removable media. Further, the computer readable medium may include all computer storage and communication media. The computer storage medium includes all volatile/nonvolatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes information transmission mediums.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the example embodiments. It shall be understood that all modifications and embodiments conceived from the meaning and scope of the claims and their equivalents are included in the scope of the inventive concept.

We claim:

1. A device for calculating dynamic variation of an object comprising:
    an enhancement processing unit that adjusts brightness of a pixel determined to indicate a particle dispersed in the object in at least two (2) images generated for the object at different time points; and
    a calculating unit that calculates dynamic variation of the object based on correlation of the different two (2) images processed by the enhancement processing unit,
    wherein the enhancement processing unit sets brightness of a pixel having brightness with a threshold value or higher for each of the images to maximum brightness,
    wherein the enhancement processing unit produces a curve graph through curve fitting for a histogram graph obtained by accumulating the number of pixels according to brightness intensity of the pixels included in the images,
    wherein the enhancement processing unit sets the threshold value as an X axis value located at the intersection of the right side of a quadrangle and the X axis,
    wherein the bottom side of the quadrangle is the X axis, the leftmost side of the quadrangle is aligned with the histogram curve starting point, the upper side of the quadrangle extends from the histogram curve starting point horizontally towards the right, and the location of the rightmost side is chosen when a first area and a second area are determined to be equal,
    wherein the first area comprises an area bounded by the upper side of the quadrangle, the rightmost side of the quadrangle, and the portion of the histogram curve contained in the quadrangle, and
    wherein the second area comprises the area under the histogram curve to the right of the quadrangle and not contained by the quadrangle.

2. The device for calculating dynamic variation of an object as claimed in claim 1, further comprising a pre-processing unit that implements pre-processing for the at least two (2) images generated at the different time points, wherein the enhancement processing unit adjusts brightness of a pixel for the images that have been subject to the pre-processing.

3. The device for calculating dynamic variation of an object as claimed in claim 1, further comprising an information providing unit that visually represents and provides the calculated dynamic variation in the images.

4. A method for calculating dynamic variation of an object by using a device for calculating dynamic variation of an object, the method comprising:
    adjusting brightness of a pixel determined to indicate a particle dispersed in an object in at least two (2) images generated for the object at different time points; and
    calculating dynamic variation of the object based on correlation of the different two (2) images that have been subject to the adjustment of the brightness,
    wherein the step of adjusting the brightness sets brightness of a pixel having brightness with a threshold value or higher for each of the images to maximum brightness,
    wherein the step of adjusting the brightness produces a curve graph through curve fitting for a histogram graph obtained by accumulating the number of pixels according to brightness intensity of the pixels included in the images,
    wherein the step of adjusting the brightness sets the threshold value as an X axis value located at the intersection of the right side of a quadrangle and the X axis,
    wherein the bottom side of the quadrangle is the X axis, the leftmost side of the quadrangle is aligned with the histogram curve starting point, the upper side of the quadrangle extends from the histogram curve starting point horizontally towards the right, and the location of the rightmost side is chosen when a first area and a second area are determined to be equal, wherein the first area comprises an area bounded by the upper side of the quadrangle, the rightmost side of the quadrangle, and the portion of the histogram curve contained in the quadrangle, and wherein the second area comprises the area under the histogram curve to the right of the quadrangle and not contained by the quadrangle.

\* \* \* \* \*